United States Patent
Miedema

(10) Patent No.: US 9,457,968 B2
(45) Date of Patent: Oct. 4, 2016

(54) CONTAINER DENESTER APPARATUS

(71) Applicant: Lakewood Process Machinery, Holland, MI (US)

(72) Inventor: Andrew Dale Miedema, Zeeland, MI (US)

(73) Assignee: A & B Packing Equipment, INC., Lawrence, MI (US)

(*) Notice: Subject to any disclaimer, the term of this patent is extended or adjusted under 35 U.S.C. 154(b) by 296 days.

(21) Appl. No.: 13/886,597

(22) Filed: May 3, 2013

(65) Prior Publication Data

US 2014/0326746 A1     Nov. 6, 2014

(51) Int. Cl.
*B65G 59/06*     (2006.01)
*B65G 59/10*     (2006.01)

(52) U.S. Cl.
CPC .......... *B65G 59/108* (2013.01); *B65G 59/066* (2013.01)

(58) Field of Classification Search
CPC ............... B65D 1/00; B65D 21/0233; B65D 2543/00203; B65D 2543/00537; B65D 43/162; B65G 59/108; B65H 3/0684
See application file for complete search history.

(56) References Cited

U.S. PATENT DOCUMENTS

| | | | |
|---|---|---|---|
| 3,074,594 A * | 1/1963 | Cheeley | 221/93 |
| 3,741,410 A * | 6/1973 | Henschke et al. | 414/795.6 |
| 3,958,720 A * | 5/1976 | Anderson | 221/93 |
| 4,048,915 A * | 9/1977 | Martin | 101/35 |
| 4,288,003 A * | 9/1981 | Fries, Jr. | 221/1 |
| 4,601,386 A * | 7/1986 | Antonello | 198/576 |
| 5,480,280 A * | 1/1996 | Bordon | 414/798.1 |
| 7,603,827 B2 * | 10/2009 | Boyer, Jr. | 53/250 |
| 2007/0278240 A1 * | 12/2007 | Dideriksen et al. | 221/1 |

* cited by examiner

*Primary Examiner* — Gene Crawford
*Assistant Examiner* — Kelvin L Randall, Jr.
(74) *Attorney, Agent, or Firm* — The Watson I.P. Group, PLC; Jovan N. Jovanovic; Vladao M. Vasiljevic

(57) ABSTRACT

A container denester apparatus for sequentially supplying nested containers, the apparatus comprising an indexer chassis, an indexing assembly and a rotating indexing arm. The rotating indexing arm is configured to extend into the clamshell cavity, which provides for the passage of clamshell containers therethrough. The indexing arm is rotationally coupled to at least one of the at least one rack gear, and has a lower cam profile and an upper cam profile, with the cam profiles extending into the clamshell cavity when properly rotated. In a starting position, a clamshell container is precluded from passage through the clamshell cavity, and, a portion of an underside surface rests upon the upper cam profile. Through rotation of the rotating indexing arm the lower cam profile forces the downward movement of the clamshell container while retaining the other clamshell containers nestedly coupled thereto.

14 Claims, 14 Drawing Sheets

CONTAINER DENESTER APPARATUS

CROSS-REFERENCE TO RELATED APPLICATION

Not Applicable

BACKGROUND OF THE DISCLOSURE

1. Field of the Disclosure

The disclosure relates in general to rigid container filling, and more particularly, to a container denester apparatus which is utilized typically upstream of a filling system. While not limited thereto, typically such an apparatus is utilized in association with clamshell containers that are often utilized in association with small fruit (i.e., blueberry, blackberry, strawberry, etc.) filling equipment. The disclosure is not limited to use in association with clamshell containers, and other containers are likewise contemplated for use, such as paperboard tray type containers (generally, that have a flange or other surface on the side which can interface with components of the apparatus).

2. Background Art

The use of containers, such as clamshell containers, is known in the art. Such containers are often utilized in association with small fruit storage, distribution and sale. In addition, such containers are likewise used in association with vegetables, prepared food and small parts and pieces.

To conserve space, these containers are typically stored and shipped in a nested configuration. To utilize the containers, a container is first denested and presented to subsequent processing. Difficulties can be encountered with the providing such nested containers sequentially to subsequent processing. Among other problems, it is often difficult to separate the nested containers and it is possible to feed multiple containers at a time. The supply of multiple containers can jam the filling equipment. In still other configurations, the denesting of the containers can fail to separate containers. At best, the subsequent processing equipment can sense this and can make adjustments. In other cases, the failure to feed a container can result in the loss of some product and possible contamination of the equipment. In either case, the efficiency of the equipment becomes compromised. Additionally, it is important to provide accurate speed and timing control so that the containers are fed to downstream equipment at the proper time and in the proper sequential order with requisite timing.

In other instances, the denesting equipment can damage a container (which tends to be rather fragile in certain directions or orientations). Among other damage, the container can be dented, thereby changing the internal fillable dimensions and configuration. In other instances, the container can be cracked, cut or damaged to the point of loss of integrity of the container itself. If such damage is not detected, the feeding of the damaged container can result in the loss of product, damage to the equipment or contamination of the equipment.

Certain advancements have been made, including, but not limited to, those that are described in co-pending U.S. patent application Ser. No. 13/429,931 filed Mar. 26, 2012, entitled "A Container Denester Apparatus," the entire disclosure of which is hereby incorporated by reference in its entirety, as well as in U.S. patent application Ser. No. 13/826,460 filed Mar. 14, 2013, entitled "A Container Denester Apparatus," the entire disclosure of which is also hereby incorporated by reference in its entirety.

There remains a need to provide additional advancements, especially to facilitate the positive separation of nested clamshell containers, and the handling of thin walled clamshell containers, without damaging the containers.

SUMMARY OF THE DISCLOSURE

The disclosure is directed to a container denester apparatus for sequentially supplying nested containers. The container denester apparatus comprising, an indexer chassis, an indexing assembly and a rotating indexing arm. The indexer chassis is attachable to an outside piece of equipment. The indexer chassis defines a clamshell cavity configured for the passage of a container therethrough. The indexing assembly is coupled to the indexer chassis, and includes a rack that is slidably movable relative to the indexer chassis, and positioned proximate the clamshell cavity. The rack has a rack gear defined on an edge thereof. The rack is configured to slidably move between a starting position and a dispensed position. At least one pinion gear is rotatably positioned upon a pivot axis coupled to the indexer chassis. The pinion gear meshes with the rack gear of the rack.

The rotating indexing arm is rotationally coupled to the rack gear. The rotating indexing arm has a lower cam profile and an upper cam profile. The cam profiles selectively extend into the clamshell cavity upon rotation of the at least one pinion gear to which the rotating indexing arm is coupled.

In the starting position, a clamshell container is precluded from passage through the clamshell cavity. At such time, a portion of an underside surface rests upon the upper cam profile. Upon slidable movement of the rack, rotation is imparted to the rotating indexing arm to, in turn, release the clamshell container and to urge the downward movement of the clamshell container to facilitate passage through the clamshell cavity, as well as to facilitate separation from an adjacent clamshell container that is nestedly coupled thereto.

In a preferred embodiment, the indexing assembly further includes a drive assembly, the drive assembly including at least one actuator coupled to the rack, the at least one actuator configured to direct the rack between the starting position and the dispensed position.

In one such embodiment, the indexing assembly further includes a first drive assembly and a second drive assembly. The rack further includes an actuator tab having a first side and a second side. The first drive assembly imparts contact against the first side of the actuator tab and the second drive assembly imparts contact against the second side of the actuator tab.

In another embodiment, the clamshell cavity has a pair of opposing sides and a pair of opposing ends. The at least one pinion gear has a first pinion gear and a second pinion gear, and a rotating indexing arm coupled to each of the first pinion gear and the second pinion gear. The first pinion gear is positioned such that the rotating indexing arm coupled thereto extends into the clamshell cavity at one of the opposing sides. The second pinion gear is positioned such that the rotating indexing arm coupled thereto extends into the clamshell cavity at one of the opposing ends.

In another embodiment, the clamshell cavity further includes a pair of opposing sides and a pair of opposing ends. The rack is positioned so as to extend along one of the pair of opposing sides, and, a second rack is positioned so as to extend along the other pair of opposing sides. In turn, the rack and the second rack are on opposing sides of the clamshell container. The second rack comprises a rack with at least one pinion gear meshing therewith. The second rack is slidably movable relative to the indexer chassis between the starting position and the dispensed position, with a rotating indexing arm coupled to at least one of at least one pinion gear.

In another preferred embodiment, the rack and the second rack each further include at least two pinion gears meshing therewith. A first one of the at least two pinion gears positioned along one of the opposing sides. The other of the at least two pinion gears being positioned along a first side edge, with a second side edge being free of any pinion gears.

In another preferred embodiment, the indexer chassis includes a first side plate and a second side plate. An inner mount plate spanning between the first side plate and the second side plate, and an outer mount plate spanning between the first side plate and the second side plate, with the outer mount plate being spaced apart from the inner mount plate wherein the clamshell cavity is defined between the inner and outer mount plates, with at least one of the inner and outer mount plates being movable relative to the other of the mount plates, to, in turn, alter the shape of the clamshell cavity.

In another preferred embodiment, the rack is slidably mounted to the first inner mount plate, and the second rack is slidably mounted to the outer mount plate.

In another embodiment, at least one of the pinion gears meshing with the rack rotates in a first direction and at least one of the pinion gears meshing with the rack rotates in a second direction. At least one of the pinion gears meshing with the second rack rotates in a first direction and at least one of the pinion gears meshing with the second rack rotates in a second direction.

In another preferred embodiment, the rack comprises an L-shaped portion with a first rack gear portion and a second rack gear portion. The first and second rack portions are spaced apart from each other.

In another such embodiment, the second rack comprises an L-shaped portion with a first rack gear portion and a second rack gear portion. The first and second rack portions are spaced apart from each other.

In yet another preferred embodiment, the lower cam profile comprises a separating wedge surface extending in a downward direction upon rotation from the starting position to the dispensed position.

In another such embodiment, the upper cam profile comprises a dispensing retaining surface arcuately spaced apart from the separating wedge surface. A holding surface is positioned opposite the separating wedge surface, with an axial notch positioned therebetween, and with the dispense retaining surface being spaced above the holding surface. The holding surface is configured to retain a lowermost clamshell container. The dispense retaining surface is configured to retain an immediately adjacent clamshell container as the separating wedge surface directs the dispensing of a lowermost clamshell container. The lowermost clamshell container passes through the notch upon rotation of the rotating indexing arms.

In another embodiment, each of the dispense retaining surface and the holding surface are substantially parallel to each other and substantially planar. The separating wedge surface substantially matches the dispense retaining surface proximate the notch, and angles downwardly arcuately away from the notch and downwardly with respect to the holding surface, to facilitate the passage of the lowermost clamshell container through the notch and into contact with the separating wedge surface.

In yet another embodiment, the indexing assembly further comprises a guide assembly which has an inner central guide and an outer central guide. Each of the inner and outer central guides are positionable on opposing sides of the clamshell cavity, and spaced apart from either end thereof. Each of the central guides are movable both toward and away from the clamshell cavity to provide a width adjustment to accommodate differently sized clamshell containers.

In a preferred embodiment, each of the inner and outer central guides each comprise a base bar fixedly coupled to the indexing frame. A width adjustment bar extends substantially perpendicular thereto. An ending bar substantially is perpendicular to each of the base bar and the width adjustment bar. A clamp member couples the base bar to the width adjustment bar allowing the width adjustment bar to slidably be positionable along the base bar, and also slidably movable in a direction substantially perpendicular to the base bar.

In one such embodiment, the guide assembly further comprises at least one auxiliary guide coupled to the indexing frame. The auxiliary guide has a clamp and a movable bar that selectively extends inwardly and outwardly into the clamshell cavity to a predetermined extent. Upon positioning in a desired orientation, the clamp retains the movable bar in such a desired orientation.

In yet another preferred embodiment, a plurality of auxiliary guides are spaced apart about a perimeter of the clamshell cavity.

Preferably, the indexer chassis is coupled to a frame, the frame facilitating arcuate adjustment of the indexer chassis relative to outside equipment to which the frame is coupled. In some such embodiments, the frame comprises a pair of opposing bracket assemblies attachable to outside equipment, and a positioning bar to which the indexing frame is coupled, the positioning bar being arcuately adjustable relative to the opposing bracket assemblies.

BRIEF DESCRIPTION OF THE DRAWINGS

The disclosure will now be described with reference to the drawings wherein.

DETAILED DESCRIPTION OF THE DISCLOSURE

Figure 1:
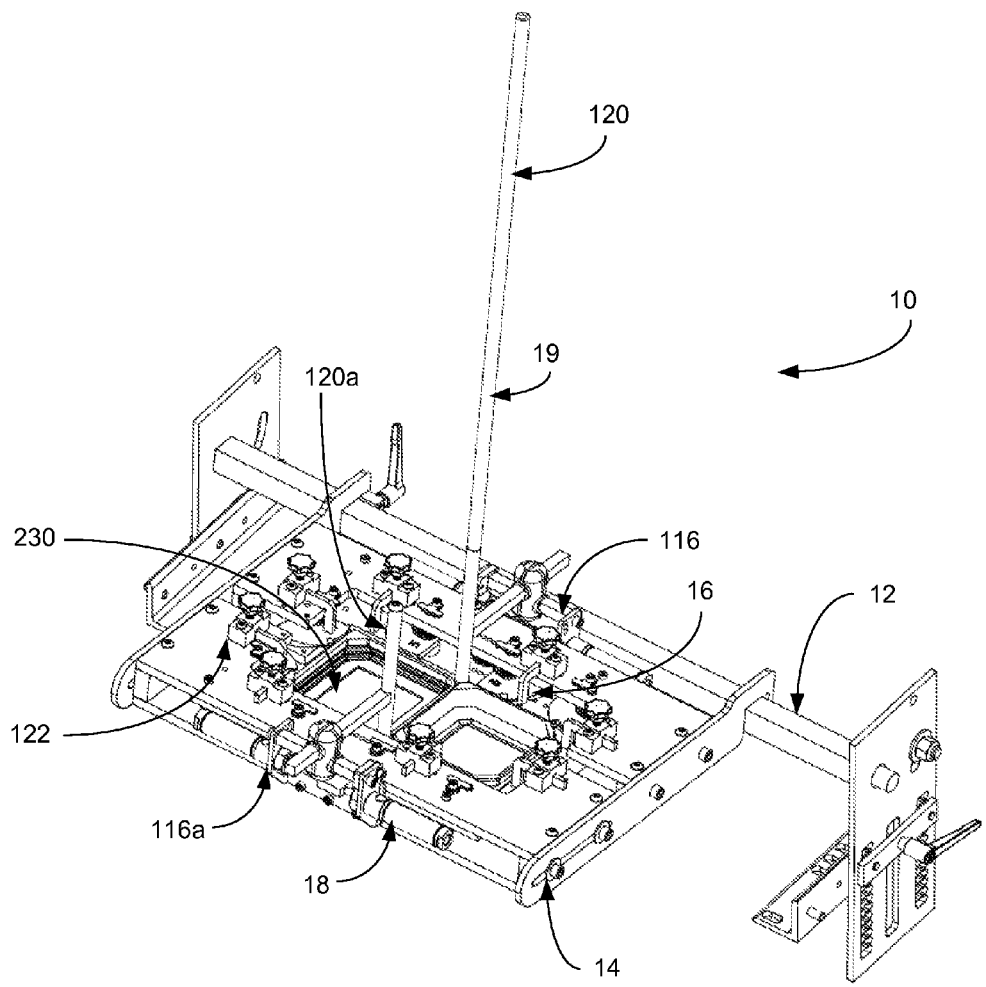
FIG. 1 of the drawings is a perspective view of the container denester apparatus of the present disclosure.

While this invention is susceptible of embodiment in many different forms, there is shown in the drawings and described herein in detail a specific embodiment with the understanding that the present disclosure is to be considered as an exemplification and is not intended to be limited to the embodiment illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and in particular to FIG. 1, the container denester apparatus is shown generally at 10. The container denester apparatus (hereinafter referred to as the denester apparatus) is configured for supplying containers, such as clamshell container 230 (FIG. 15) sequentially to filling equipment. Among other things that are typically filled into such containers, include, but are not limited to berries, such as blueberries, raspberries, blackberries, strawberries, and the like. Of course, the same containers are utilized for other products, such as candies, nuts and the like. The invention is not limited to any particular filling equipment, or to any particular material which would be filled into the containers. Again, while clamshell containers are shown in the drawings, the disclosure is specifically not limited to clamshell containers, but can be utilized with other containers, such as paperboard tray containers, or the like (which are often covered with cellophane or other materials). As long as the container has the requisite structure to cooperate with the apparatus, it can be utilized in association with the present disclosure.

Figure 15:
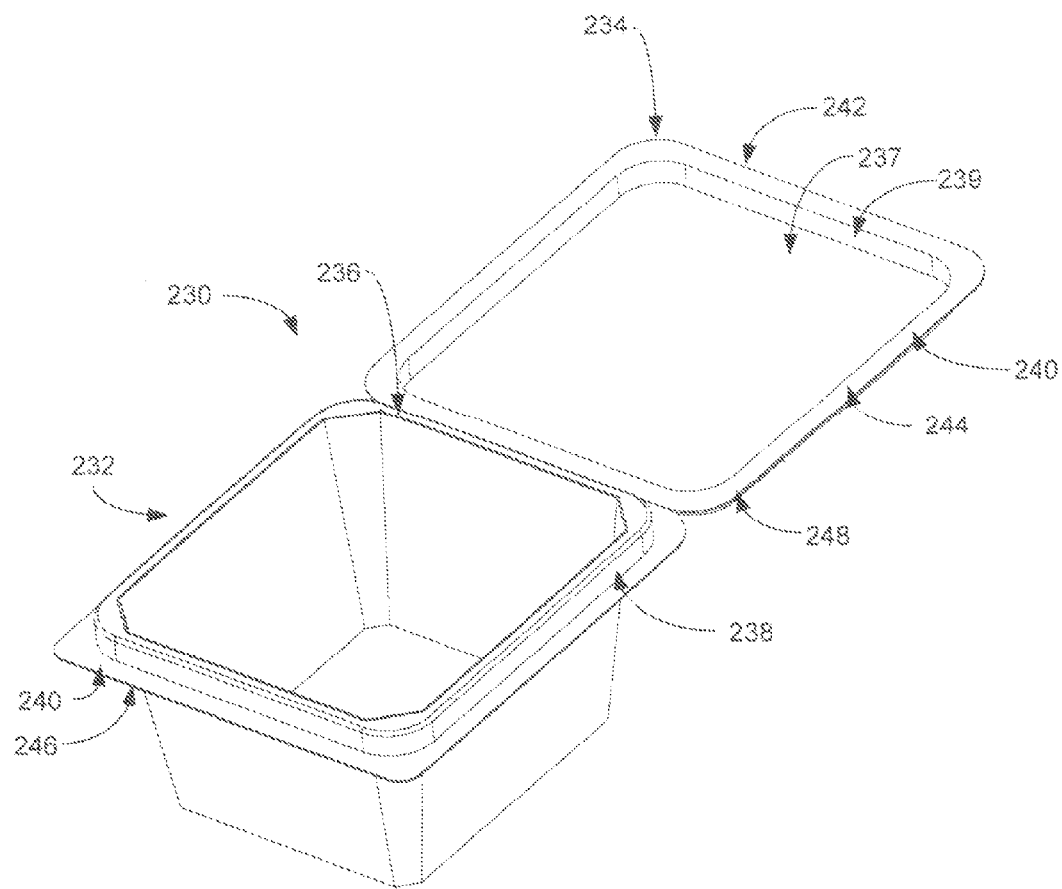
FIG. 15 of the drawings is a perspective view of an exemplary clamshell container which can be supplied through the container denester apparatus, with the understanding that it is not limited thereto, but rather to be deemed exemplary.

A typical clamshell container 230 is shown in FIG. 15 as comprising first housing 232, second housing 234, hinge 236. Typically, the clamshell container 230 starts with the housings on either side of the hinge 236 wherein the housings are rotated about the hinge so that they overlie each other and provide a single cavity. An attachment structure 237 is typically provided that locks the first housing to the second housing. In the embodiment shown, the attachment structure comprises a raised ridge 238 on one of the housings and a recessed mating portion 239 which engage and are held through an interference fit or a snap fit.

A flange 240 extends about substantially the entirety of the outer perimeter of the clamshell container, and includes first housing flange portion 240 and second housing flange portion 242. The flanges actually form the basis from which the hinge 236 is formed. The flange 240 includes upper surface 244, lower surface 246. The upper and lower surfaces together define the outward edge 248. The denester apparatus cooperates with the flange 240 to supply the clamshell containers, sequentially, and in an indexed fashion to filling equipment (not shown). Other containers may have different cavities, or a single cavity, and may include different flange structures, provided that the flange structures can cooperate with the apparatus.

Figure 2:
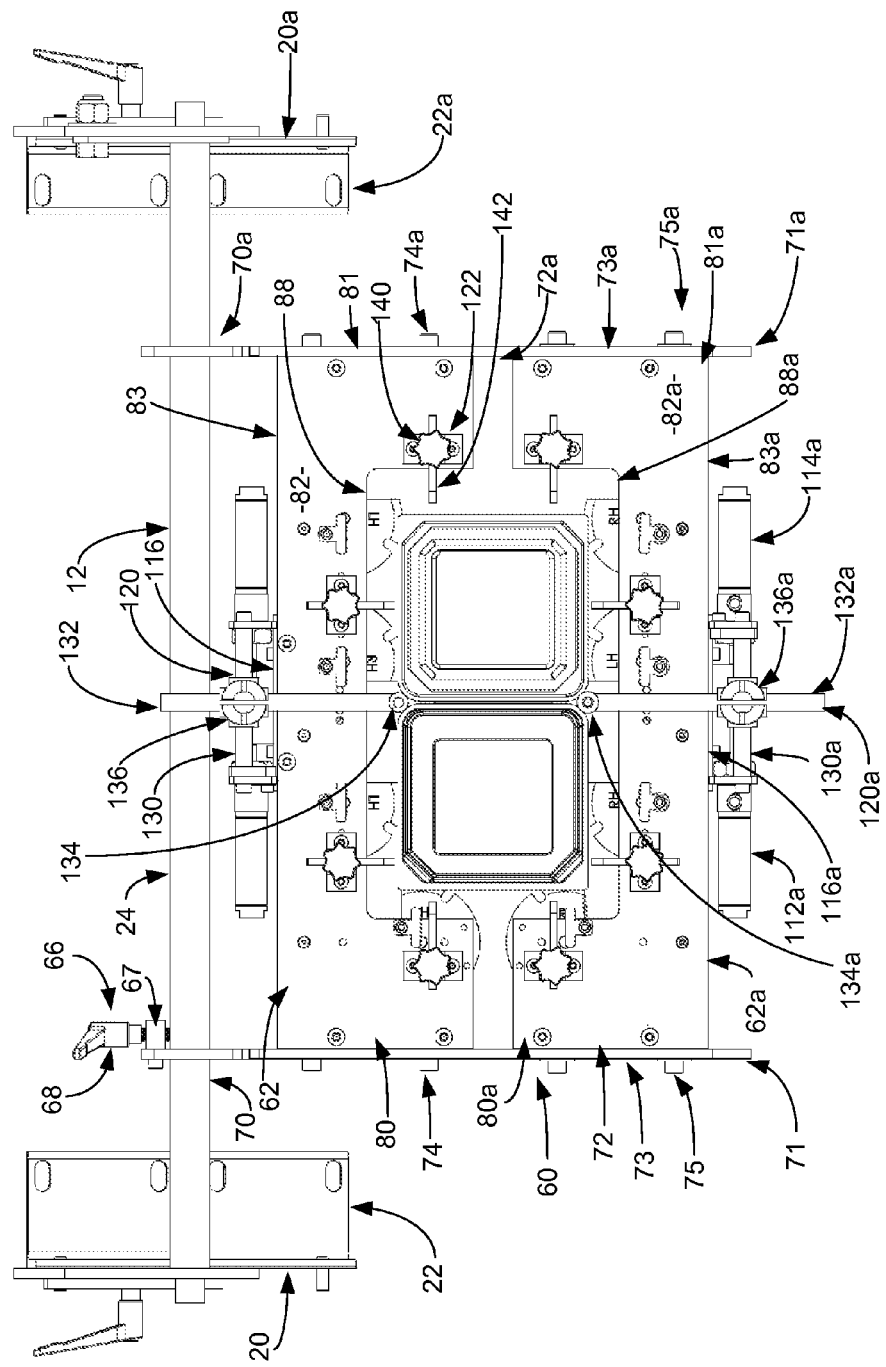
FIG. 2 of the drawings is a top plan view of the container denester apparatus of the present disclosure.
Figure 3:
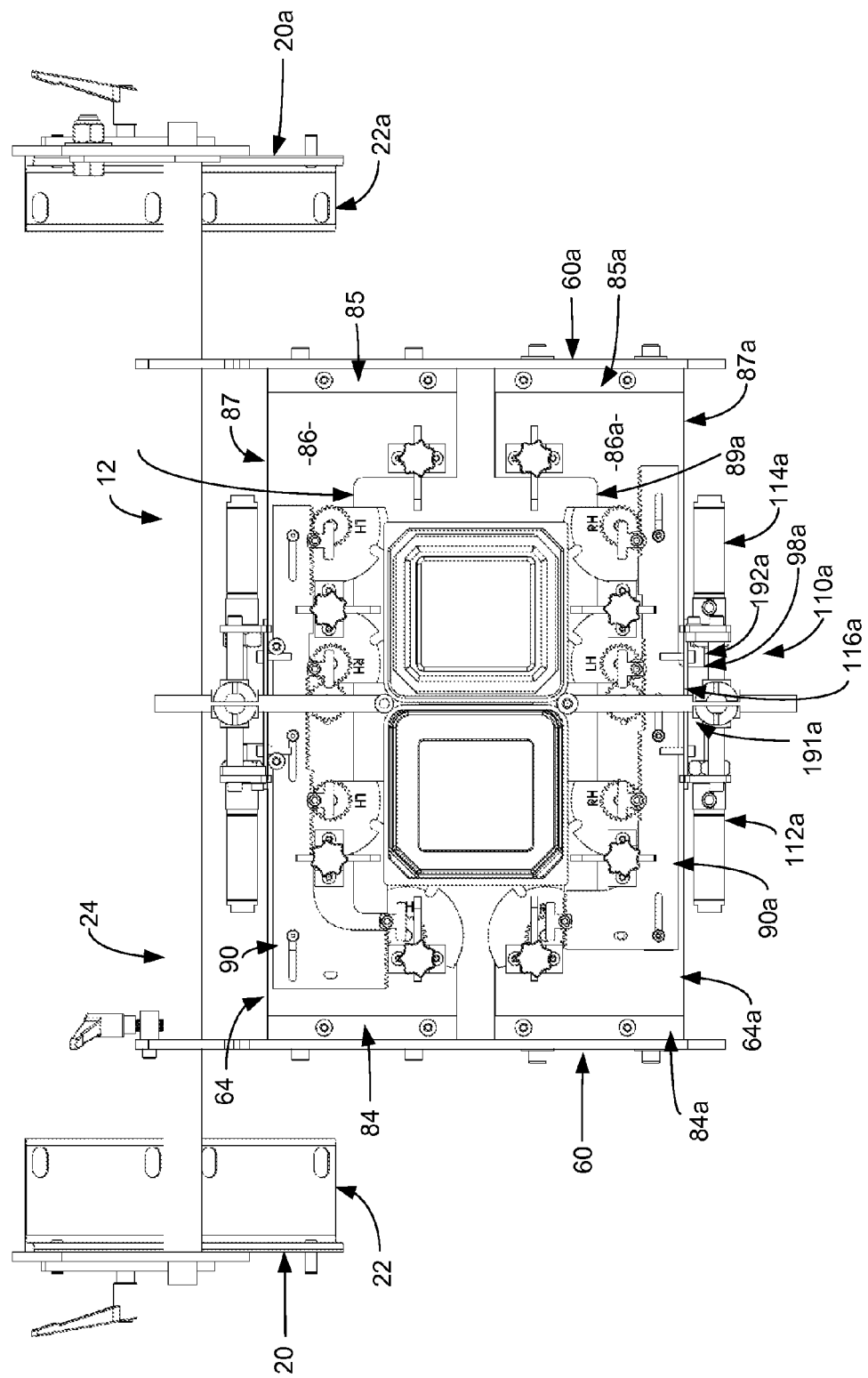
FIG. 3 of the drawings is a top plan view of the container denester apparatus of the present disclosure, with the removal of the inner and outer upper mount plates to expose the indexing assembly.

The denester apparatus is shown in greater detail in FIGS. 1 through 3 as comprising frame 12, indexer chassis 14, indexing assembly 16, drive assembly 18 and guide assembly 19. The frame 12 provides the coupling of the indexer chassis and the equipment to which the denester apparatus is coupled (i.e., a small particle filler, such as a blueberry filler, and the like), The frame 12 is shown in greater detail in FIG. 4 as comprising first mount plate 20, second mount plate 20a, first bracket assembly 22, second bracket assembly 22a and positioning bar 24. The first mount plate 20 and the second mount plate 20a are substantially mirror images of each other. As such, the first mount plate 20 will be described with the understanding that it is substantially identical to the second mount plate 20a, and that like structures will be identified with the same reference number augmented with an "a" thereafter.

The first mount plate 20 includes positioning bar opening 21, arcuate adjustment opening 23, and three substantially parallel slots, including a central lower guide slot 25, first lower indexing slot 26 and second lower indexing slot 28. The indexing slots further include a plurality of substantially perpendicular slots 29 that are spaced apart from each other along the length of the slot. As will be explained below, the positioning bar opening, and the arcuate adjustment opening 23 interface with the positioning bar 24, whereas the three parallel slots interface with the first bracket assembly 22. The first mounting plate 20 and the second mounting plate 20a are configured to provide a coupling (with adjustment ability) of the indexer chassis relative to the equipment to which the indexer is coupled.

As with the first mount plate 20 and the second mount plate 20a, the first bracket assembly 22 and the second bracket assembly 22a are substantial mirror images of each other. As such the first bracket assembly 22 will be described with the understanding that it is substantially identical to the second bracket assembly 22a. Like structures on the second bracket assembly will be identified with the same reference number as those on the first bracket assembly, augmented by an "a" thereafter.

The first bracket assembly 22 further includes inner angle member 30, outer clamp member 32, guide vice member 34, first indexing pin 35 and second indexing pin 36. The inner angle member 30 includes vertical portion 31 and horizontal portion 33. The horizontal and vertical portions are substantially perpendicular to each other and as such define what is commonly referred to as angle iron. The vertical portion 31 includes guide opening 40, first indexing opening 41 and second indexing opening 42. The horizontal portion 33 includes openings through which fasteners may be extended and coupled.

The outer clamp member 32 comprises guide opening 43, first indexing opening 44 and second indexing opening 45. It will be understood that in operable positioning, the guide vice member interfaces with the guide opening 40 of the vertical portion of the inner angle member, and the guide opening 43 of the outer clamp member. Similarly, the first index pin 35 extends through the first index opening 41 of the inner angle member and the first index opening 44 of the outer clamp member. Finally, the second index pin 36 extends through the second index opening 42 of the inner angle member and the second index opening of the outer clamp member. The first and second index pins may be coupled to either one or both of the inner angle member and the outer clamp member.

It will be understood that the first indexing pin is configured to rest within the transverse slots 29 of the first lower indexing slot 26 of the first mount plate 20. Similarly, the second indexing pin is configured to rest within the transverse slots 29 of the second lower indexing slot 28. The pins, along with the guide vice member 34 maintain the first bracket assembly 22 relative to the first mount plate 20 in the desired orientation. That is, the first bracket assembly can be moved in a first direction to move the pins away from the slots, at which time the bracket assembly can be moved in either an upward or downward direction. Once the desired orientation is reached, the first bracket assembly can be moved so that the pins re-engage the slots 29. Upon re-engagement, the guide vice member can be tightened so as to tighten the inner angle member relative to the outer clamp member and to maintain the orientation that has been selected.

Figure 4:
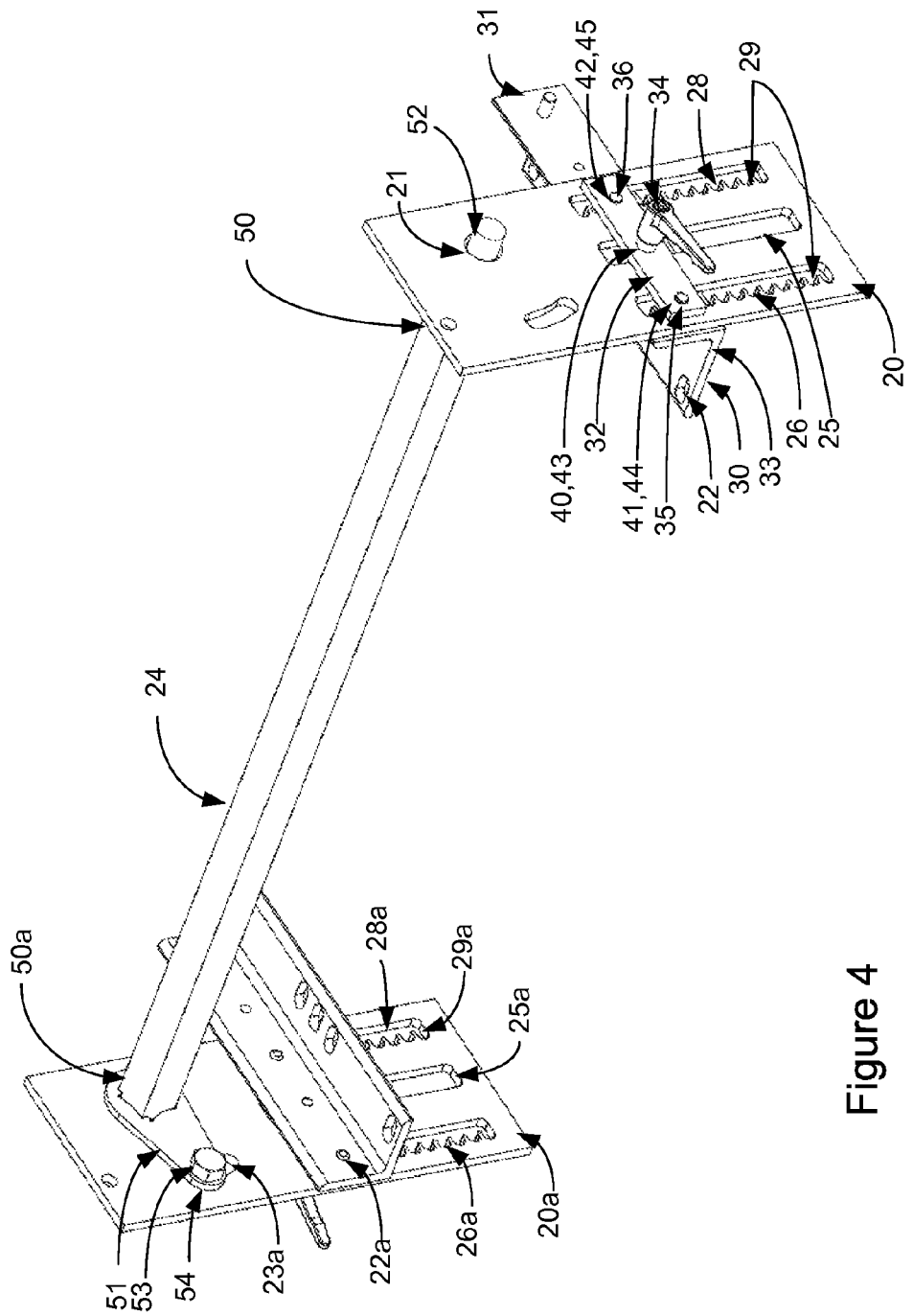
FIG. 4 of the drawings is a perspective view of the frame of the container denester apparatus of the present disclosure.
Figure 5:
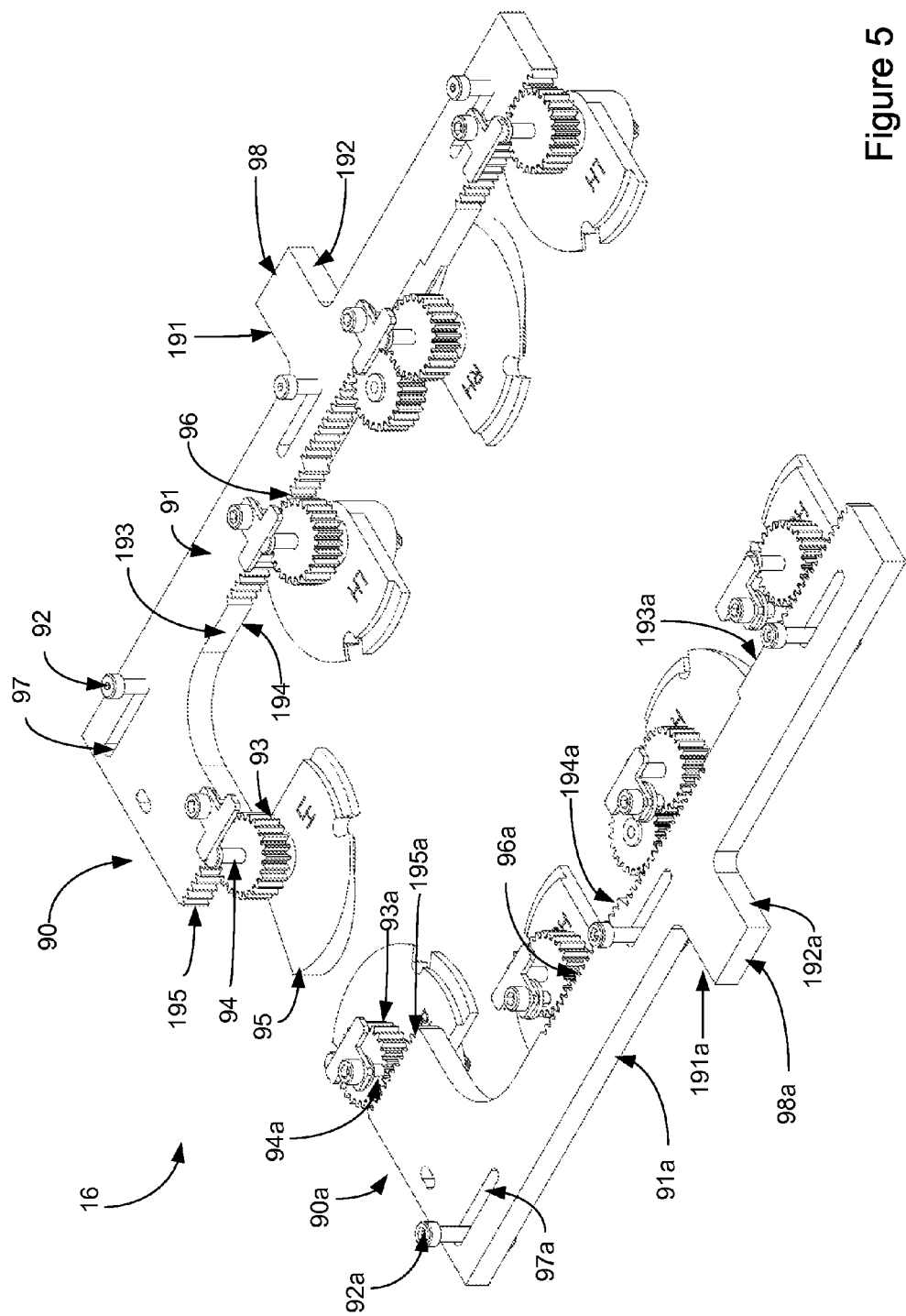
FIG. 5 of the drawings is a perspective view of the inner indexing and outer indexing subassemblies of the container denester apparatus of the present disclosure.
Figure 6:
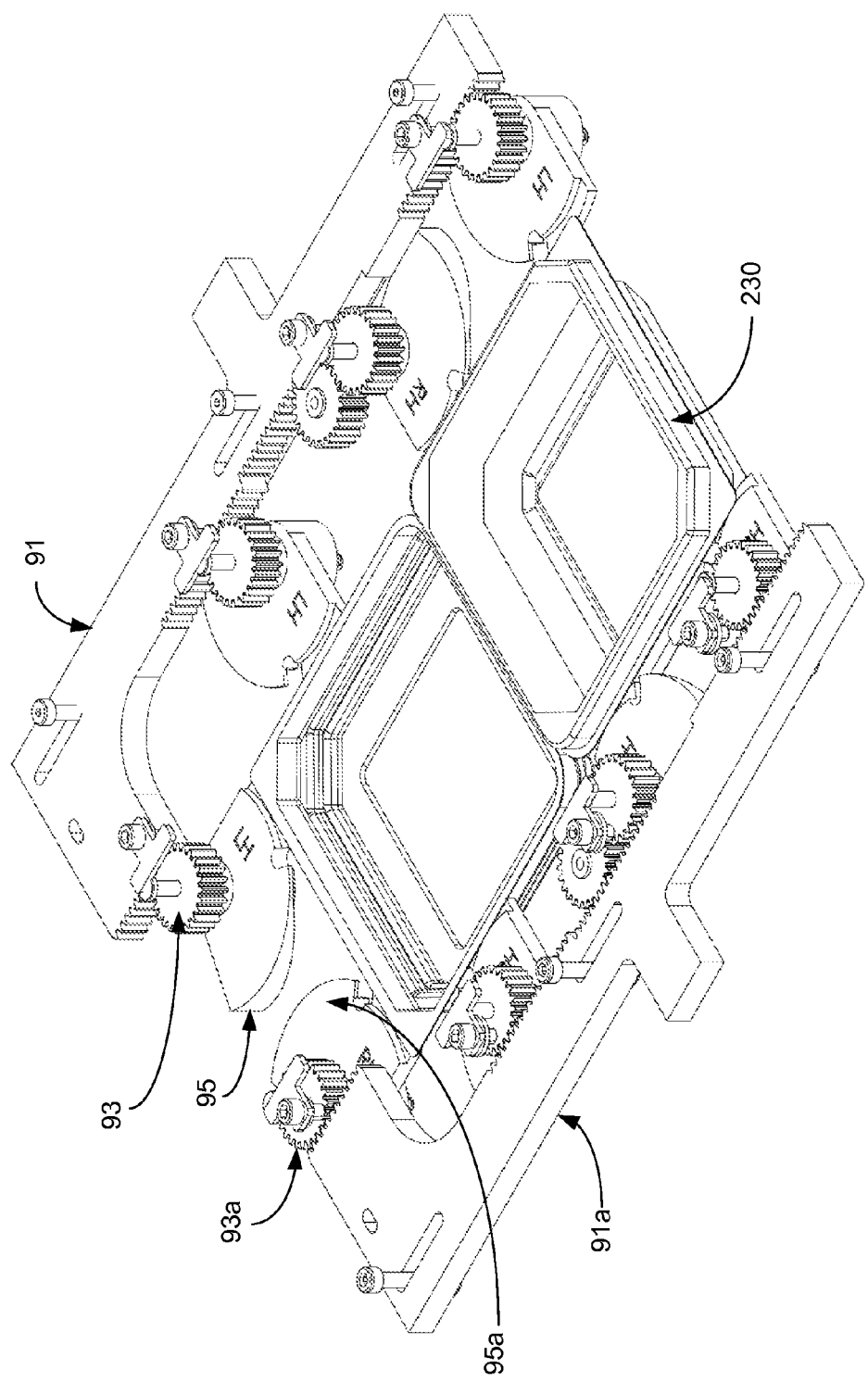
FIG. 6 of the drawings is a perspective view of the inner indexing and outer indexing subassemblies of the container denester apparatus of the present disclosure, showing, in particular, the placement of a clamshell container when the indexing subassemblies are in a starting position.
Figure 7:
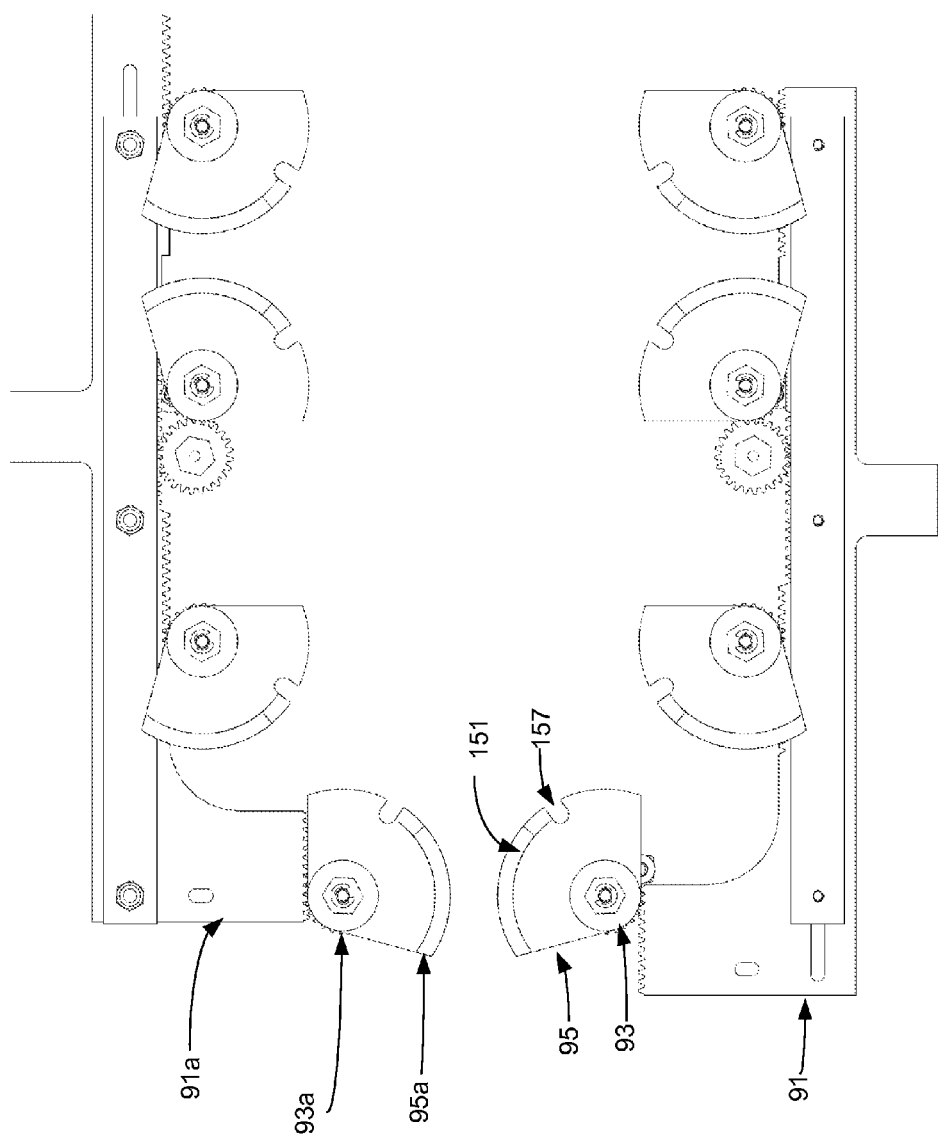
FIG. 7 of the drawings is a bottom plan view of the inner and outer indexing subassemblies of the container denester apparatus of the present disclosure.
Figure 8:
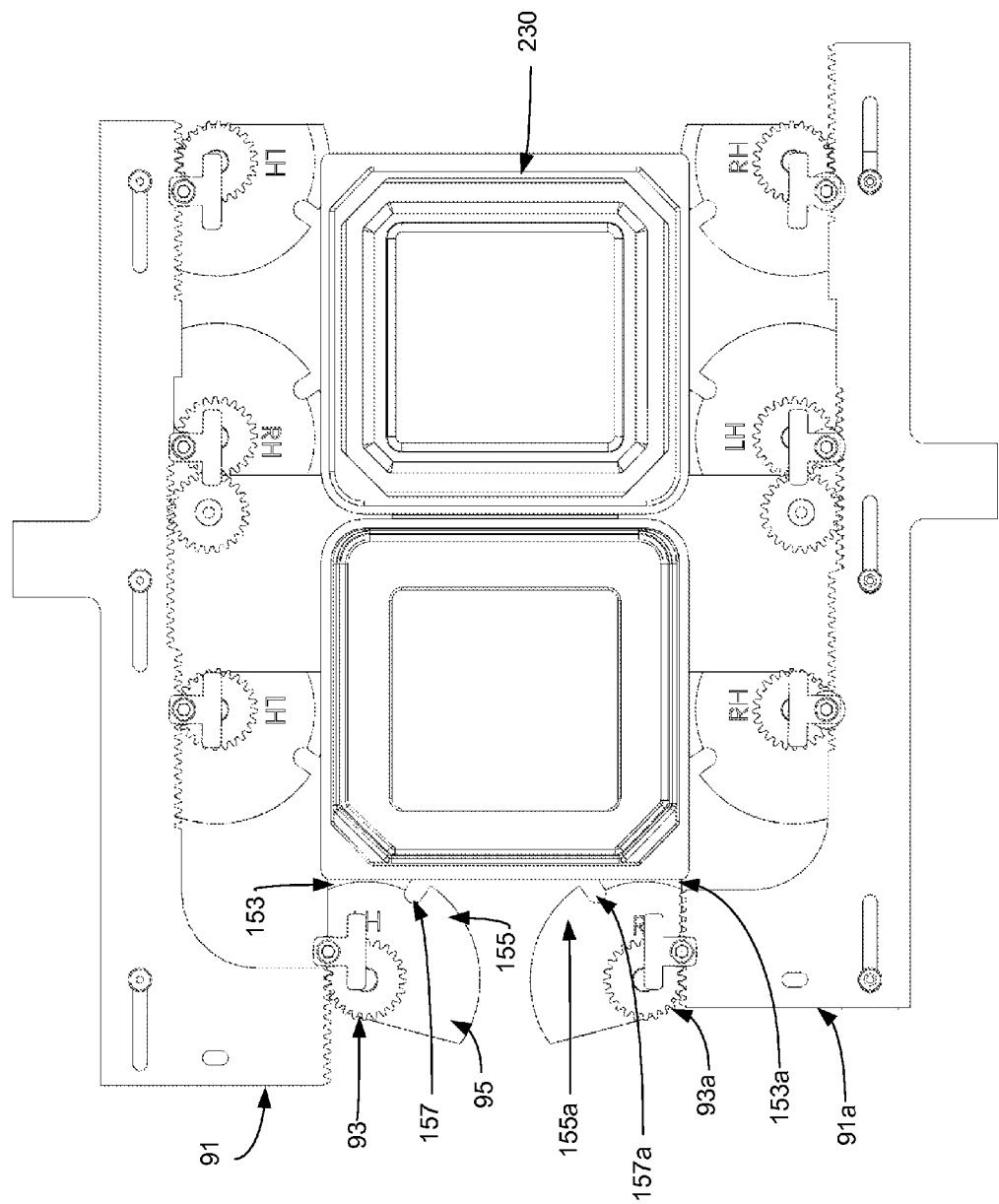
FIG. 8 of the drawings is a top plan view of the inner and outer indexing subassemblies of the container denester apparatus of the present disclosure, showing, in particular, a clamshell container positioned thereon, and the indexing subassemblies shown in the starting position.
Figure 9:
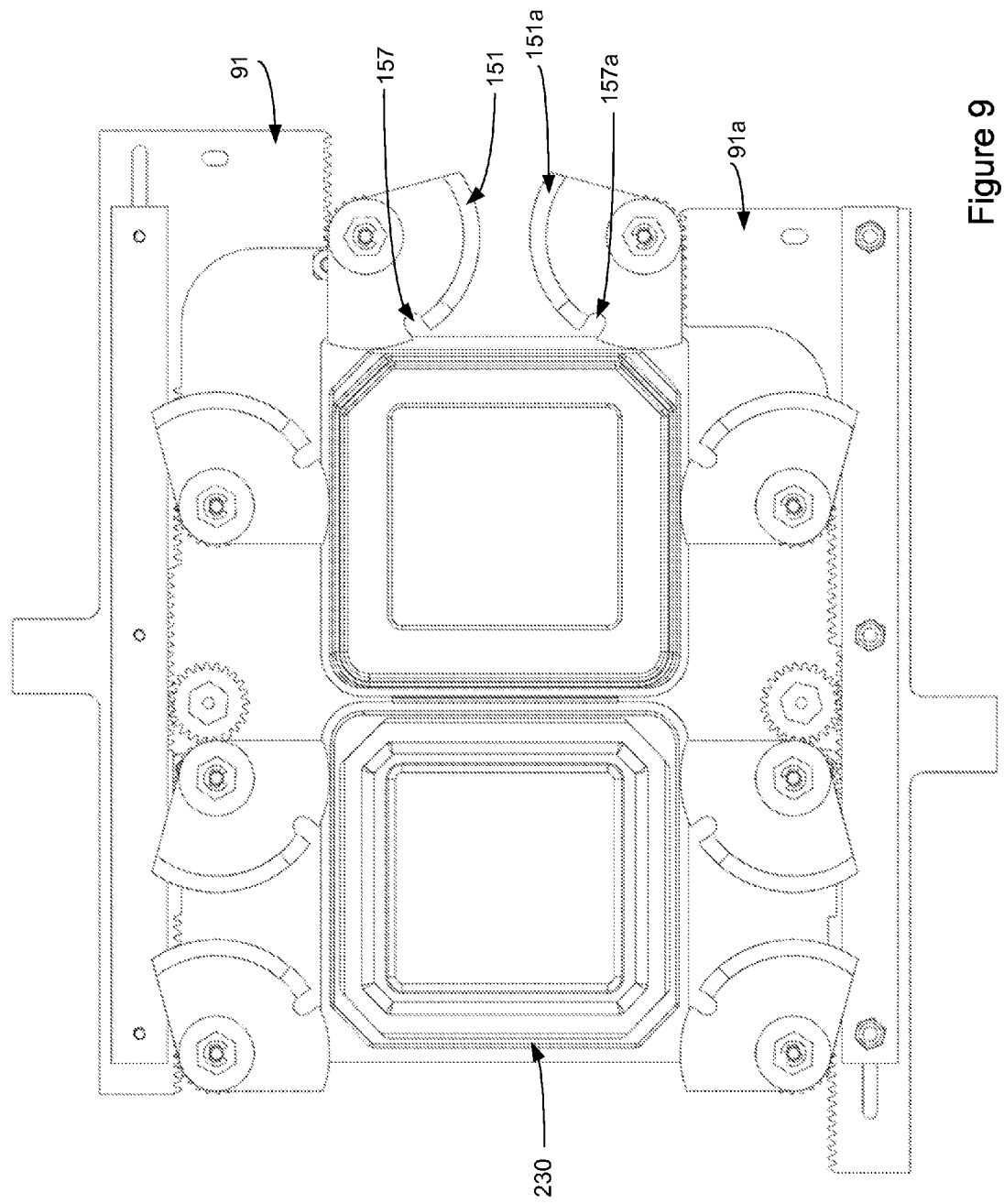
FIG. 9 of the drawings is a bottom plan view of the inner and outer indexing subassemblies of the container denester apparatus of the present disclosure, showing, in particular, a clamshell container positioned therein, with the indexing subassemblies in a starting position.

The positioning bar 24 is shown in FIG. 4 as comprising first end 50 and second end 50a. At the second end 50a, end plate 51 is positioned. The end plate comprises an offset member having a pivot axis pin 52 and a spaced apart arc opening 53, through which clamping pin 54 is extended. In the embodiment shown, the positioning bar has a substantially square configuration, although other configurations are contemplated, which configurations include surfaces, preferably, that can be indexed or keyed, or that include surfaces which preclude the inadvertent rotation of the indexing assembly relative to the positioning bar.

The positioning bar 24 is configured such that first end 50 interfaces with the first mount plate 20 and that second end 50a interfaces with second mount plate 20a. In the engagement, the positioning bar pivots about an axis defined by the pivot axis pin 52 and the pivot axis pin 52a engaging within the respective positioning bar opening 21, 21a. At the same time, the clamping pin 54 extends through the spaced arc opening 53 and into the arcuate adjustment opening 23a. The sliding of the clamping pin within the arcuate adjustment opening limits the rotational movement of the positioning bar relative to the second mount plate.

The indexer chassis 14 is shown in FIGS. 2 and 3 as comprising first side plate 60, second side plate 60a, inner lower mount plate 62, outer lower mount plate 62a, inner upper mount plate 64 and outer upper mount plate 64a. The indexer chassis 14, as will be explained further below, is coupled to the positioning bar 24 in a removable, slidable and repositionable manner, while being rotationally fixed thereto.

More specifically, the first side plate 60 is substantially identical to the second side plate 60a. As such the first side plate 60 is described with the understanding that the second side plate 60a is substantially identical. The first side plate 60 includes inner end 70, outer end 71, inner surface 72, outer surface 73, locking mechanism 66, inner mount 74 and outer mount 75. At the inner end, a notch 76 is positioned opening in a generally downward direction. This notch 76 is sized so as to match the cross-sectional configuration of the positioning bar, for mating engagement therewith.

The locking mechanism 66 is positioned at the inner end, and includes an inwardly extending plate 67 with a clamp member 68 coupled thereto. The clamp member positionally fixes the first side plate 60 (and, in turn, the indexer chassis 14) relative to the positioning bar. That is, loosening the clamp member allows for slidable movement of the first side plate 60 (and, the entirety of indexer chassis 14) relative to the positioning bar 24.

The outer end 71 extends away from the inner end 70. The inner and outer surfaces 72, 73 are substantially planar so as to define a member of substantially uniform thickness. Generally, the first side plate 60 defines an elongated relatively thin bar having a width that is substantially larger than its thickness. Additionally, in the embodiment shown, the first side plate 60 is substantially perpendicular to the positioning bar 24. Of course other configurations are contemplated for use.

The inner mount 74 comprises a plurality of spaced apart openings that extend through the first side plate at a location that is between the inner end 70 and the outer end 71 (see, also FIG. 1). In the embodiment shown, the upper and lower plates are coupled to each other so that they are vertically spaced apart from each other (i.e., one above the other). In the embodiment shown, a pair of openings is provided for coupling of the two inner plates in fixed orientation.

The outer mount 75 comprises a plurality of elongated slots that extend through the first side plate at a location that is between the position of the inner mount 74 and the outer end 71 (see, also FIG. 1). The elongated slot is generally linear and in the direction from the inner end to the outer end. As such, the outer plates can translate along the slots relative to the first side plate 60 toward and away from the outer end 71 of the first side plate 60.

The second side plate 60a, as set forth above, is a substantial mirror image of the first side plate 60. As such, the second side plate 60a includes inner end 70a, outer end 71a, inner surface 72a, outer surface 73a, inner mount 74a and outer mount 75a. The second side plate differs from the first side plate in that the locking mechanism 66 of the first side plate 60 is not replicated on the second side plate. It is contemplated that a single locking mechanism is capable of fixedly positioning the indexer chassis 14 relative to the positioning bar 24.

The inner lower mount plate 62 comprises first side 80, second side 81, top surface 82, bottom surface 83 and inside edge 88. The lower mount plate 62 spans between the first side plate 60 and the second side plate 60a between the inner end and the outer end thereof. The inner upper mount plate 64 includes first side 84, second side 85, top surface 86, bottom surface 87 and inside edge 89. The inner upper mount plate 64 is positioned over the inner lower mount plate 62 and the two are substantially parallel to each other and in a spaced apart orientation. As will be explained below, the inner portions of the indexing assembly, the drive assembly and the guide assembly are coupled to the inner lower and upper mount plates.

The outer lower mount plate 62a comprises first side 80a, second side 81a, top surface 82a, bottom surface 83a and inside edge 88. The lower mount plate 62a spans between the first side plate 60 and the second side plate 60a between the inner and outer end thereof. The outer upper mount plate 64a includes first side 84a, second side 85a, top surface 86a, bottom surface 87a and inside edge 89. The outer upper mount plate 64a is positioned over the outer lower mount plate 62a and the two are substantially parallel to each other and in a spaced apart orientation. As will be explained below, the outer portions of the indexing assembly, the drive assembly and the guide assembly are coupled to the outer lower and upper mount plates.

Additionally, the inner plates 62, 64 and the outer plates 62a, 64a are substantially co-planar within the corresponding plates. That is, the inner lower mount plate 62 and the outer lower mount plate 62a are substantially co-planar and spaced apart from each other by a gap (that corresponds, in part, to the opening to receive the clamshell container therethrough). Similarly, the inner upper mount plate 64 and the outer upper mount plate 64a are co-planar and spaced apart from each other by the same gap (that is, a gap that is configured to receive the clamshell container therethrough). Further, the outer lower mount plate 62a and the outer upper mount plate 64a are slidably adjustable relative to the first side plate 60 and the second side plate 60a so as to change the width of the gap therebetween. Such an adjustment allows for the use of different clamshell containers that have a different width dimension.

The indexing assembly is shown in FIGS. 5 through 9 as comprising inner indexing subassembly 90 and outer indexing subassembly 90a. The two structures are substantially identical in function, and include corresponding structures. Thus, the inner indexing subassembly will be described in greater detail with the understanding that the outer indexing subassembly 90a has similar components having the same functionality.

More specifically, the inner indexing subassembly 90 includes rack 91, rack pins, such as rack pin 92, pinion gears 93, pivot axle 94 and rotating indexing arms, such as rotating indexing arm 95. Rack 91 comprises a substantially planar member that is positioned between the inner lower mount plate 62 and the inner upper mount plate 64. The rack 91 includes a plurality of spaced apart rack gears, such as rack gear 96, movement slots 97 and actuator tab 98. The rack gears are positioned along an inner edge 193 of the rack 91. In the present embodiment, the inner edge 193 comprises a substantially L-shaped configuration with a first portion 194 that is substantially parallel to the first side plate and a second portion 195 that is substantially parallel to the first portion but spaced apart from the first portion.

It is contemplated that the rack gears may comprise a continuous gear that extends along much of, or substantially all of, the first and second portions 194, 195 of the inner edge 193 of the rack 91. It will be understood that the gears need only be positioned along the inner edge 193 at locations wherein the inner edge 193 interfaces with the pinion gears 93. Thus, where a continuous gear is presented along the inner edge 193, a plurality of discrete contact portions can be defined along the continuous gear, each of which may be defined as a rack gear. It is also contemplated that each contact portion may comprise a different gear profile, or, all of the rack gears may have an identical gear profile.

The rail pins 92 are configured to extend through the movement slots 97 and to be fixed to at least one of the inner lower mount plate 62 and the inner upper mount plate 64. With the movement slots being elongated slots that are substantially parallel to the second portion 195 of the inner edge 193. As such, the rack 91 is configured to slidably move between the first side plate and the second side plate to the extent permitted by the sizing of the movement slots 97.

As will be explained below, the actuator tab comprises a projection that extends out of the side opposite of the inner edge 193. The actuator tab includes first side 191 and second side 192. The actuator tab, as will be explained below, is configured to interface with the drive assembly 18 to control the slidable movement of the rack 91 back and forth between a starting position proximate the first side plate to a dispensed portion proximate the second side plate.

The pinion gears, such as pinion gear 93, are positioned at strategic locations along the inside edge 88 of the inner lower mount plate 62 and inside edge 89 of the inner upper mount plate 64 in a spaced apart configuration. Each pinion gear meshes with the rack, such that slidable movement of the rack imparts rotation of the pinion gears. Each pinion gear pivots on a pivot axle, such as pivot axle 94.

Figure 11:
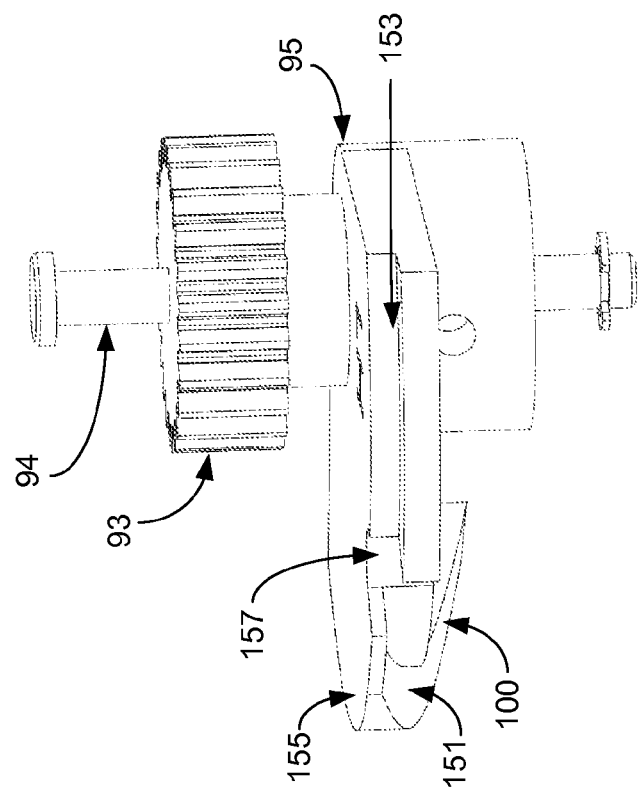
FIG. 11 of the drawings is a perspective view of an exemplary rotating indexing arm with coupled pinion gear and pivot axle, the particular exemplary arm being one of the LH type in a slightly different rotational position than when shown in FIG. 5.
Figure 10:
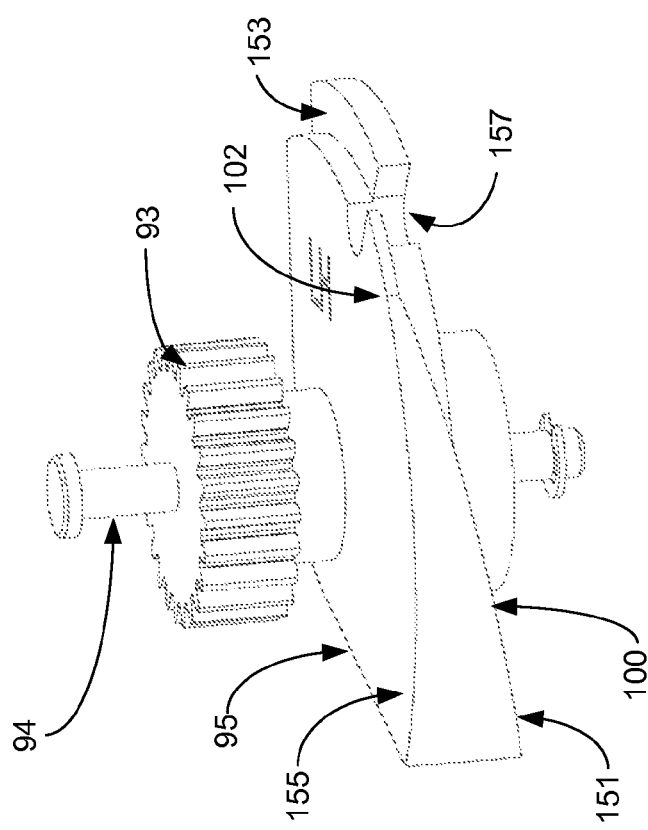
FIG. 10 of the drawings is a perspective view of an exemplary rotating indexing arm with coupled pinion gear and pivot axle, the particular exemplary arm being one of the LH type.

A rotating indexing arm, such as rotating indexing arm 95 is fixedly coupled to a corresponding pinion gear 93, and configured to rotate about the same axle, namely axle 94 (and in certain embodiments, the pinion gear and the rotating indexing arm may be co-molded). The rotating indexing arm 95 is shown in greater detail in FIGS. 10 and 11 as comprising a generally arcuate perimeter having a lower cam profile 100 and an upper cam profile 102. The lower cam profile 100 includes a separating wedge surface 151 which extends for a particular arcuate distance and which surface comprises a wedge that gains thickness (preferably, in a downward direction) as further rotation forward in the dispensing direction (i.e., the rack position toward the dispensing position). The upper cam profile 102 includes retaining surface portion 153 and holding surface portion 155. The retaining surface portion 153 is positioned opposite of the separating wedge surface 151 and is substantially planar relative to the axis of rotation. The holding surface portion 155 is positioned, arcuately adjacent to the separating wedge surface 153 and is spaced apart (downwardly) from the plane defined by the retaining surface portion 153 so as to be on different, but substantially parallel planes.

Additionally, an axially inward notch 157 separates the arcuate portion that includes the retaining surface portion 153 and the holding surface portion 155. The notch extends axially inwardly beyond the surfaces 151, 153 and 155. It will be understood that the notch allows for the clamshell container to pass from the dispenser retaining surface 153 to the separating wedge surface 151, while the clamshell containers above the lowermost clamshell container are maintained by the holding surface 155.

It will be understood that the rotating indexing arms that are shown as having an LH are left hand arms such that they are configured to rotate counter-clockwise when viewed from the top as the rack extends from the starting position and proceeds to the dispensed position. The rotating index arms having an RH are right hand arms such that they are configured to rotate clockwise when viewed from the top as the rack extends from the starting position and proceeds to the dispensed position. In the case of the RH rotating indexing arms, it is necessary to introduce a gear train (that is, an intermediate gear) so that the pinion gear associated with such indexing arms has a rotation that is counter to the rotation of the LH arms. By having both LH and RH rotating index arms, better retention of the clamshell container as well as improved control can be realized. This is especially helpful where there is a relatively deeper clamshell container. Such a configuration greatly aids in the separation of two adjacent clamshell containers.

The outer indexing subassembly 90a includes rack 91a, rack pins, such as rack pin 92a, pinion gears 93a, pivot axle 94a and rotating indexing arms, such as rotating indexing arm 95a. Rack 91a comprises a substantially planar member that is positioned between the outer lower mount plate 62a and the outer upper mount plate 64a. The rack 91a includes a plurality of spaced apart rack gears, such as rack gear 96a, movement slots 97a and actuator tab 98a. The rack gears are positioned along an inner edge 193a of the rack 91a. As with the opposing rack, the inner edge 193a comprises a substantially L-shaped configuration with a first portion 194a that is substantially parallel to the first side plate and a second portion 195a that is substantially parallel to the first portion but spaced apart from the first portion.

It is contemplated that the rack gears substantially correspond to the rack gears of the opposing rack 91.

The rail pins 92a are configured to extend through the movement slots 97 and to be fixed to at least one of the outer lower mount plate 62a and the outer upper mount plate 64a. With the movement slots being elongated slots that are substantially parallel to the second portion 195a of the inner edge 193a. As such, the rack 91a is configured to slidably move between the first side plate and the second side plate to the extent permitted by the sizing of the movement slots 97a. It is likewise contemplated that the rack 91 and the rack 91a are substantial mirror images of each other such that the two may comprise identical dimensions thus aiding in the commonality of parts.

As will be explained below, the actuator tab comprises a projection that extends out of the side opposite of the inner edge 193a. The actuator tab includes first side 191a and second side 192a. The actuator tab, as will be explained below, is configured to interface with the drive assembly 18 to control the slidable movement of the rack 91a back and forth between a starting position proximate the first side plate to a dispensed portion proximate the second side plate.

The rotating indexing arms that are coupled to the rack 91a of the outer indexing subassembly are substantially identical to those that are coupled to the rack 91 of the inner indexing subassembly. The position and operation of these will be described below.

Figure 12:
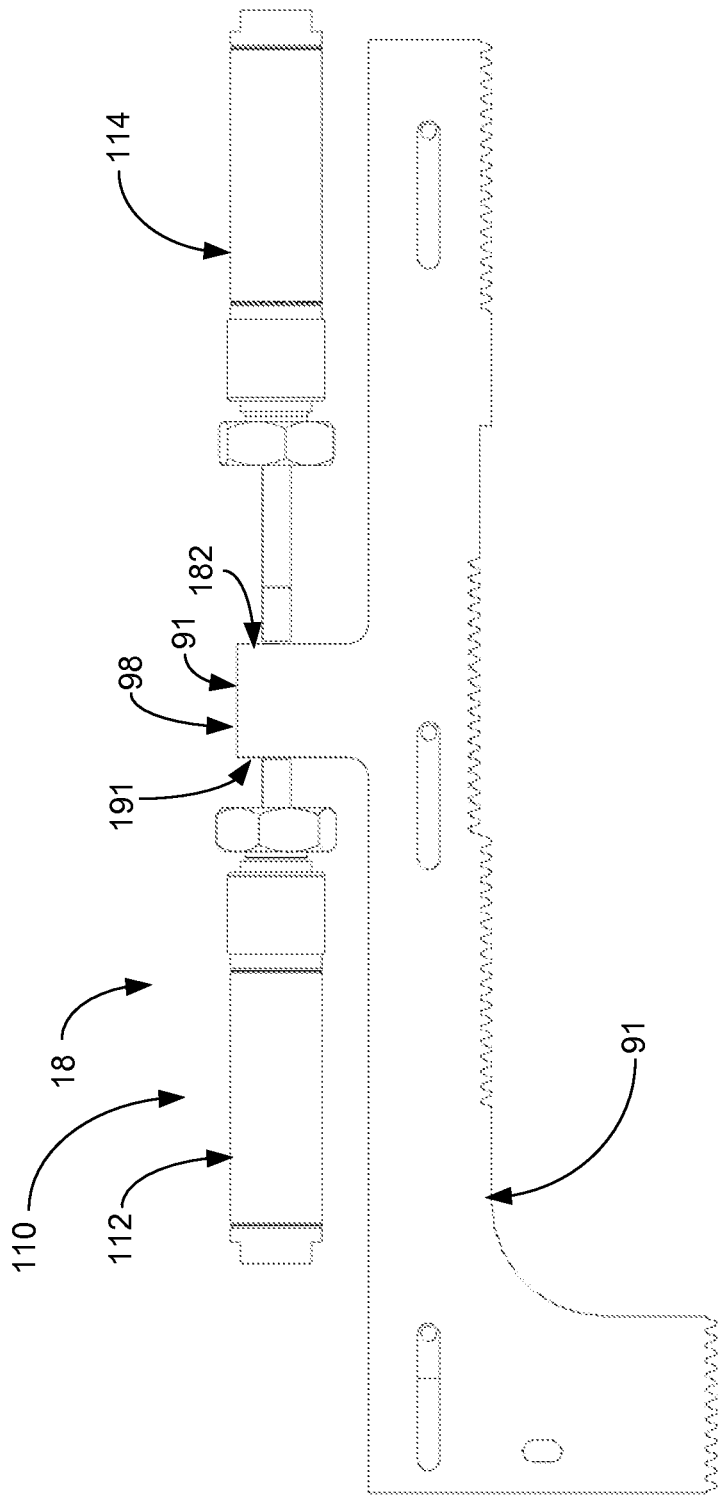
FIG. 12 of the drawings is a top plan view of the rack and the inner drive assembly of the present disclosure.

The drive assembly 18 is shown in FIG. 1 as comprising inner rack actuator subassembly 110 and outer rack actuator subassembly 110a. The inner rack actuator subassembly 110 is shown in greater detail in FIG. 12 as including first direction actuator 112, second direction actuator 114 and inner actuator mount 116 (FIG. 2). With reference to FIG. 2, inner actuator mount 116 comprises brackets that are fixedly mounted to the inner lower mount plate 62 and the inner upper mount plate 64. Referring again to FIG. 12, the first direction actuator 112 is mounted to one side of the inner actuator mount 116 and the second direction actuator 114 is mounted to the other side of the inner actuator mount 116 such that the two actuators 112, 114 face each other and actuate in opposite directions. The two actuators are mounted on opposing sides of the actuator tab 98 such that the first direction actuator 112 interfaces with first side 191 of the actuator tab 98. The second direction actuator 114 interfaces with the second side 192 of the actuator tab 98. It will be understood that actuation of the first direction actuator 112 directs the rack 91 toward the dispensing position by forcing the first side 191 away from the actuator body 112 and toward the actuator 114. Conversely, actuation of the second direction actuator 114 directs the rack 91 toward the starting position by forcing the second side 192 away from the actuator body 114 and toward the actuator 112. It is contemplated that the actuators 112, 114 may comprise solenoids, pneumatic cylinders and/or hydraulic cylinders, among others.

With reference to FIG. 3, the outer rack actuator subassembly 110a includes first direction actuator 112a, second direction actuator 114a and inner actuator mount 116a. The inner actuator mount 116a comprises brackets that are fixedly mounted to the outer lower mount plate 62a and the outer upper mount plate 64a. The first direction actuator 112a is mounted to one side of the inner actuator mount 116a and the second direction actuator 114a is mounted to the other side of the inner actuator mount 116 such that the two actuators 112a, 114a face each other and actuate in opposite directions. The two actuators are mounted on opposing sides of the actuator tab 98a such that the first direction actuator 112a interfaces with first side 191a of the actuator tab 98a. The second direction actuator 114a interfaces with the second side 192a of the actuator tab 98a. It will be understood that actuation of the first direction actuator 112a directs the rack 91a toward the dispensing position by forcing the first side 191a away from the actuator body 112a and toward the actuator 114a. Conversely, actuation of the second direction actuator 114a directs the rack 91a toward the starting position by forcing the second side 192a away from the actuator body 114a and toward the actuator 112a. It is contemplated that the actuators 112a, 114a may comprise solenoids, pneumatic cylinders and/or hydraulic cylinders, among others.

It will be understood that the actuators of the inner rack actuator 110 and the actuators of the outer rack actuator 110a are configured to operate in a coordinated fashion such that the two racks 91, 91a move in a unified fashion to properly dispense clamshell containers through the coordinated movement of the rotating indexing arms.

The guide assembly 19 is shown in FIG. 2 as comprising inner central guide 120, outer central guide 120a and auxiliary guides 122. The inner central guide 120 is substantially identical to the outer central guide 120a, and, as such, the inner central guide 120 will be described with the understanding that the outer central guide 120a is substantially identical. Additionally, like structures on the outer central guide have been identified with the same reference numbers augmented by an "a" thereafter.

Figure 13:
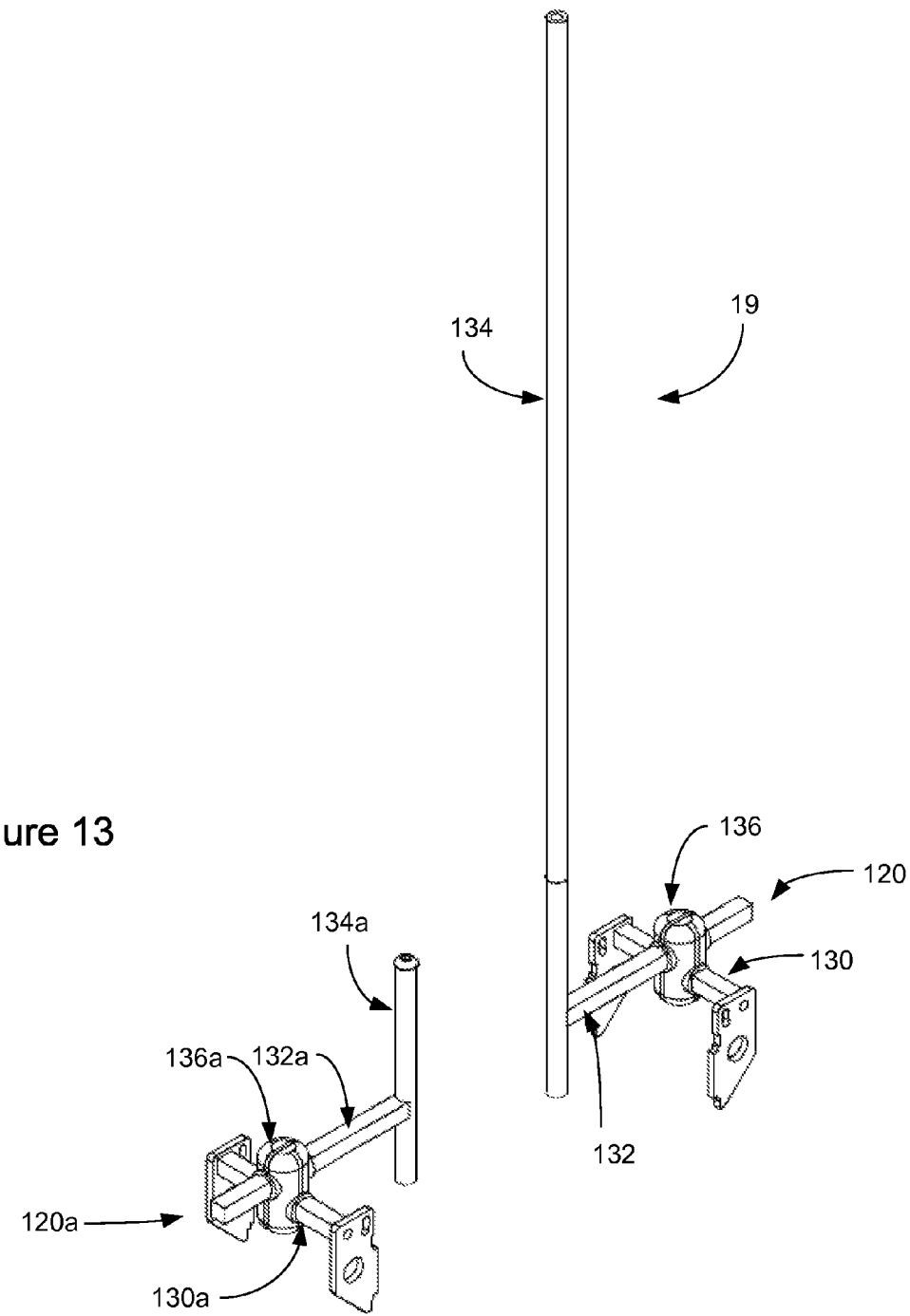
FIG. 13 of the drawings is a perspective view of the inner central guide and the outer central guide of the guide assembly of the container denester apparatus of the present disclosure.

With reference to FIG. 13, the inner central guide 120 includes base bar 130, width adjustment bar 132, ending bar 134 and clamp member 136. The base bar 130 is substantially parallel to the movement of the rack and is generally centrally located between the first and second side plates 60, 60a. In the embodiment shown, the base bar is positioned over the actuators such that it is spaced apart from the inner edges of the inner lower mount plate 62 and the inner upper mount plate 64. The clamp member 136 is configured to slidably be positionable and retainable at virtually any point along the base bar 130. The width adjustment bar 132 extends substantially perpendicular to the base bar and extends through the clamp member 136, as well. The width adjustment bar 132 is slidably positionable relative to the clamp member 136 such that the spacing of the distal end of the width adjustment bar can be varied relative to the inner surfaces of the inner mount plates. Finally, the ending bar 134 extends substantially vertically and substantially perpendicular to the width adjustment bar at the distal end thereof. The ending bar 134 is substantially perpendicular to both the base bar and the width adjustment bar. As will be explained below, the inner central guide is configured to interface with the hinge portion that forms the joint between the first and second clamshell housings.

Similarly, the outer central guide 120a includes base bar 130a, width adjustment bar 132a, ending bar 134a and clamp member 136a. The outer central guide 120a is positioned on the opposite side of the clamshell cavity. The two central guides 120, 120a are positioned on either side of the hinge of the clamshell container so as to maintain the clamshell containers in the proper orientation.

Figure 14:
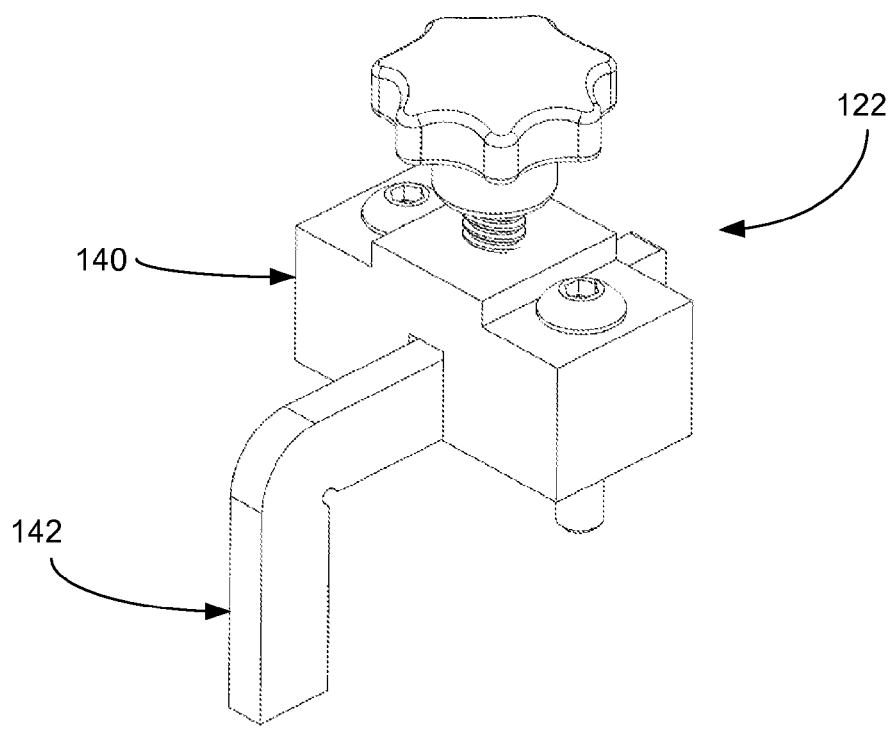
FIG. 14 of the drawings is a perspective view of the auxiliary guide of the guide assembly of the container denester apparatus of the present disclosure.

With reference to FIG. 2 and FIG. 14, the auxiliary guides 122 each comprise clamp 140 and bar 142. The auxiliary guides are spaced around the perimeter of the cavity configured to receive clamshell containers that is defined by the inner edges of the inner and outer upper and lower mount plates. The auxiliary guide 122 will be described with the understanding that each one of the auxiliary guides is substantially identical. The clamps 140 include a frame and a tightening element. The bar 142 is slidably positioned within an opening defined by the frame and the tightening element. The tightening element can be utilized to clamp the bar and fix the orientation relative to the clamp. As will be explained below, the auxiliary guides facilitate the use of the indexing chassis with a plurality of differently sized clamshell containers.

In operation, it is first necessary to adjust the indexer chassis, the drive assembly and the guide assembly for the dimensions of the clamshell containers that are to be processed through the container denester apparatus. Advantageously, due to the configuration of the racks 91, 91a and the position of the rotating indexing arms, a number of dimensionally different clamshell containers can be processed by the apparatus. For example, the racks are L-shaped such that one end may be configured to include rotating indexing arms while accommodating containers of different length. Additionally, the outer mount plates can be slidably moved toward and away from the inner mount plates to accommodate different widths (along the outer mounts 75, 75a). Finally, the adjustment arms can compensate for dimensional differences in the containers.

More particularly, once the configuration of the clamshell container is determined, the inner and the outer centering guides 120, 120a can be adjusted so that they correspond to the hinge of the clamshell container. To adjust the centering guides 120, 120a, the clamp member 136 can be slid along the base bar 130 until the proper orientation is achieved. Next, the width adjustment bar 132 can be slidably moved relative to the clamp member 136 until the distal end and the clamping bar 134 is positioned adjacent the hinge of the clamshell container. The same can be achieved with the outer centering guide 120a. As such, the ending bars 134 are positioned proximate the hinge on either side thereof, and naturally provide a centering for the stack of clamshell containers, as, in part, there is a recess or detent defined at the hinge at either end, into which recess the ending bar can be positioned.

The auxiliary guides 122 can also be adjusted such that the different guides straddle and surround the clamshell containers that are in the stack of containers. As such, the stack is generally limited in tilting and rocking from side to side, and generally contained in the proper orientation for dispensing by the indexing assembly. It will be understood that to adjust any one of the auxiliary guides, the user can loosen the clamp 140 and slidably move the bar relative thereto. Once the proper desired orientation is achieved, the clamp can again be tightened.

Once the guide assembly, and in particular the central guide and the auxiliary guides have been positioned in the desired orientation, the indexing assembly can be placed in a proper starting position and clamshell containers can be placed within the apparatus. In the starting position, the rack 91 is positioned so as to be directed toward the first side plate 60. In such an orientation, the pinion gears 93 and the corresponding rotating indexing arms 95 are positioned such that the dispensing retaining surface 153 extends into the clamshell cavity, preferably as far as possible. Similarly, the rack 91a is positioned so as to be directed toward the second side plate 60a. In such an orientation, the pinion gears 93 and the corresponding indexing arms 95a are positioned such that the dispensing retaining surface 153a extends into the clamshell cavity, preferably as far as possible.

In such a configuration, the dispensing retaining surfaces 153, 153a extend far enough into the clamshell cavity that when the clamshell containers are introduced in the manner shown in FIG. 1, these surfaces interface with the corresponding flanges of the lowermost clamshell container and preclude passage of any one of the clamshell containers. The remaining clamshell containers then extend upwardly in a nested stack above the lowermost clamshell container. It will be understood that, when in a nested configuration, the individual adjacent clamshells have flanges that are spaced apart from each other a predetermined distance leaving a flange gap therebetween.

Once the clamshell containers have been stacked up and retained by the orientation of the rotating indexing arms, the container denester apparatus is ready to dispense clamshell containers. To achieve the dispensing of the first clamshell container, the drive assembly 18 is actuated by actuating the first direction actuator 112 of the inner rack actuator 110 and the first direction actuator 112a of the outer rack actuator 110a. Such actuation directs the rack 91 toward the dispensing position. As the rack slides along the track determined by the sliding of the movement slots 97, the rack gears 93 slidably move relative to the pinion gears 93, causing the pinion gears to rotate about pivot axis 94. As the pinion gears are fixed to a rotating indexing arm, the arm is caused to rotate.

In the case of the RH rotating indexing arms, the counter-clockwise rotation (as viewed from the top), slidably rotates the dispensing retaining surface 153 out of the way of the lower surface of the lowermost clamshell container. Further rotation, has the lowermost clamshell container pass through the notch 157 and come into contact with the separating wedge surface 151. The inclined separating wedge surface 151 imparts a downward force on the upper surface of the flange so as to separate that clamshell container from the immediately adjacent clamshell container. The opposing holding surface 155 simultaneously contacts the lower surface of the immediately adjacent clamshell container, and as it is substantially planar (or, not inclined to the extent of the lower surface), the holding surface 155 holds the remaining clamshell containers, precluding them from also passing through the clamshell cavity.

Eventually, as the rack 91 reaches the dispensing position, the separating wedge surface 151 has forced the lowermost clamshell container to separate from the stack of containers and proceed through the clamshell cavity and onto further processing (such as a conveyor, filler, washer, sorter, etc.).

It will be understood that the LH rotating indexing arms have the same operation in reverse, that is, the surfaces are engaged in the same manner, as stated above, and in the same order, however, the rotation of the rotating indexing arms is in the clockwise direction or rotation.

It will also be understood that the rack 91a slidably moves in a direction that is opposite that of the rack 91, that is, the rack moves toward the first side plate as the rack 91a proceeds from the starting position to the dispensed position.

Once the lowermost clamshell container has been dispensed, the immediately adjacent clamshell container becomes the lowermost container. The system then needs to return to its original starting position so that the cycle can repeat and dispense subsequent lowermost clamshell containers.

To achieve a return to the starting position, the second direction actuator 114 of the inner rack actuator 110 is activated directing the rack 91 (and in particular, the actuator tab) back toward the first side plate 60. Such movement imparts rotation, in a reverse direction, to the pinion gears 93, and the rotating indexing arms 95. As such, the rotating indexing arms labeled LH rotate clockwise directing the holding surface 155 out of the way of the lower surface of the flange of the lowermost clamshell container. Eventually, contact is fully released, however, at the same time that the holding surface 155 is releasing contact, the dispensing retaining surface 153 engages the lower surface of the flange of the lowermost clamshell container, thereby precluding passage of the clamshell containers through the clamshell cavity.

Similarly, the rack 91a is directed by second direction actuator 114a of the outer rack actuator 110a back toward the second side plate 60a, and into the starting position. The cycle can now be repeated to dispense what is now the lowermost clamshell container. This cycle can repeat as many times as desired or until the remaining clamshell containers have been dispensed. The rate of actuation of the rack 91 generally determines the rate at which the different clamshell containers are released.

Advantageously, the racks are configured so that each clamshell portion is controlled by a total of four rotating indexing arms. It will be understood that a greater or lesser amount of rotating indexing arms may be utilized without departing from the scope of the present disclosure. In the embodiment shown, by positioning pairs of rotating indexing arms at the outer corners of the first clamshell portion, and, pairs of rotating indexing arms along the side edge of the second clamshell portion, the system can easily accommodate clamshell containers that are both wider and longer than the clamshell container of the embodiment shown. Such an adjustment does not require adjustment or movement of the rotating indexing arms, as no rotating indexing arms are present along the distal edge of the second clamshell portion.

The use of the rotating indexing arms provides a positive surface of support for the stack of clamshell containers during dispensing. This is helpful as the clamshell containers tend to vary in size due to typical variations in manufacturing process (and may vary through a relatively large range). Additionally, due to the variation, it is often the case that gravity alone does not provide sufficient force on the lowermost clamshell container to dislodge the clamshell container from the stack of clamshell containers even where there is nothing retaining the lowermost clamshell container within the container denester apparatus.

That is, not only is the surface removed from the lower surface of the flanges of the lowermost container, but the separating wedge surface 151 provides a downward force upon the top surface of the flange of the lowermost clamshell container. Thus, the force provides the necessary urging to dislodge the lowermost clamshell container from immediately adjacent clamshell containers, to effectively dispense the same. Finally, due to the relative positioning of the rotating indexing arms on opposing sides of the clamshell cavity, and due to the relatively large surfaces, containers that have a range of sizes (due to rather wide tolerances) can be processed through the clamshell denester apparatus without binding or becoming jammed within the clamshell container cavity.

It will be further understood that in various different embodiments, it may become necessary to adjust the frame relative to the outside device. Wherein such a need arises, a number of adjustments can be presented. For example, the positioning bar, through the end plates 51, 51a can be rotationally adjusted relative to the first and second bracket assemblies. The first and second bracket assemblies can be translated and clamped to the first and second mount plates 20, 20a in a number of different positions (essentially adjusting the height of the indexer chassis relative to the remainder of the equipment). These adjustments provide increased versatility as the same apparatus can be configured to interface with different equipment, and, not only with different clamshell containers.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A container denester apparatus for sequentially supplying nested containers, the apparatus comprising:

an indexer chassis attachable to an outside piece of equipment, the indexer chassis defining a clamshell cavity configured for the passage of a container therethrough;

an indexing assembly coupled to the indexer chassis, the indexing assembly including a rack that is slidably movable relative to the indexer chassis, and positioned proximate the clamshell cavity, the rack having a rack gear defined on an edge thereof, and the rack configured to slidably move between a starting position and a dispensed position, and, at least one pinion gear rotatably positioned upon a pivot axis coupled to the indexer chassis, the at least one pinion gear meshing with the rack gear of the rack; and a rotating indexing arm rotationally coupled to at least one of the at least one rack gear, the rotating indexing arm having a lower cam profile and an upper cam profile, with the cam profiles selectively extending into the clamshell cavity upon rotation of the at least one pinion gear to which the rotating indexing arm is coupled;

wherein in the starting position, a clamshell container is precluded from passage through the clamshell cavity, and, a portion of an underside surface rests upon the upper cam profile, and whereupon slidable movement of the rack directs the rotation of the rotating indexing arm to release the clamshell container and to urge a downward movement of the clamshell container to facilitate passage through the clamshell cavity, as well as to facilitate separation from an adjacent clamshell container that is nestedly coupled thereto, and wherein the indexing assembly further includes a drive assembly, the drive assembly including at least one actuator coupled to the rack, the at least one actuator configured to direct the rack between the starting position and the dispensed position, and wherein the indexing assembly further includes a first drive assembly and a second drive assembly, the rack further including an actuator tab having a first side and a second side, the first drive assembly imparting contact against the first side of the actuator tab and the second drive assembly imparting contact against the second side of the actuator tab.

2. The indexing assembly of claim 1 wherein the clamshell cavity has a pair of opposing sides and a pair of opposing ends, the at least one pinion gear comprising a first pinion gear and a second pinion gear, and a rotating indexing arm coupled to each of the first pinion gear and the second pinion gear, with the first pinion gear being positioned such that the rotating indexing arm coupled thereto extends into the clamshell cavity at one of the opposing sides and the second pinion gear being positioned such that the rotating indexing arm coupled thereto extends into the clamshell cavity at one of the opposing ends.

3. The indexing assembly of claim 1 wherein the lower cam profile comprises a separating wedge surface extending in a downward direction upon rotation from the starting position to the dispensed position.

4. The indexing assembly of claim 3 wherein the upper cam profile comprises a dispensing retaining surface arcuately spaced apart from the separating wedge surface, and a holding surface positioned opposite the separating wedge surface, with an axial notch positioned therebetween, and with the dispense retaining surface being spaced above the holding surface, wherein the holding surface is configured to retain a lowermost clamshell container, and wherein the dispense retaining surface is configured to retain an immediately adjacent clamshell container as the separating wedge surface directs the dispensing of a lowermost clamshell container, with the lowermost clamshell container passing through the notch upon rotation of the rotating indexing arms.

5. The indexing assembly of claim 4 wherein each of the dispense retaining surface and the holding surface are substantially parallel to each other and substantially planar, and wherein the separating wedge surface substantially matches the dispense retaining surface proximate the notch, and angles downwardly arcuately away from the notch and downwardly with respect to the holding surface, to facilitate the passage of the lowermost clamshell container through the notch and into contact with the separating wedge surface.

6. A container denester apparatus for sequentially supplying nested containers, the apparatus comprising:
   an indexer chassis attachable to an outside piece of equipment, the indexer chassis defining a clamshell cavity configured for the passage of a container therethrough;
   an indexing assembly coupled to the indexer chassis, the indexing assembly including a rack that is slidably movable relative to the indexer chassis, and positioned proximate the clamshell cavity, the rack having a rack gear defined on an edge thereof, and the rack configured to slidably move between a starting position and a dispensed position, and, at least one pinion gear rotatably positioned upon a pivot axis coupled to the indexer chassis, the at least one pinion gear meshing with the rack gear of the rack; and
   a rotating indexing arm rotationally coupled to at least one of the at least one rack gear, the rotating indexing arm having a lower cam profile and an upper cam profile, with the cam profiles selectively extending into the clamshell cavity upon rotation of the at least one pinion gear to which the rotating indexing arm is coupled;
   wherein in the starting position, a clamshell container is precluded from passage through the clamshell cavity, and, a portion of an underside surface rests upon the upper cam profile, and whereupon slidable movement of the rack directs the rotation of the rotating indexing arm to release the clamshell container and to urge a downward movement of the clamshell container to facilitate passage through the clamshell cavity, as well as to facilitate separation from an adjacent clamshell container that is nestedly coupled thereto, and
   wherein the clamshell cavity further includes a pair of opposing sides and a pair of opposing ends, the rack being positioned so as to extend along one of the pair of opposing sides, and, a second rack being positioned so as to extend along the other pair of opposing sides, such that the rack and the second rack are on opposing sides of the clamshell container, the second rack comprising a rack with at least one pinion gear meshing therewith, the second rack being slidably movable relative to the indexer chassis between the starting position and the dispensed position, with a rotating indexing arm coupled to at least one of at least one pinion gear, and
   wherein the rack and the second rack each further include at least two pinion gears meshing therewith, a first one of the at least two pinion gears positioned along one of the opposing sides, and the other of the at least two pinion gears being positioned along a first side edge, with a second side edge being free of any pinion gears, and
   wherein the indexer chassis includes a first side plate and a second side plate, with an inner mount plate spanning between the first side plate and the second side plate, and an outer mount plate spanning between the first side plate and the second side plate, with the outer mount plate being spaced apart from the inner mount plate wherein the clamshell cavity is defined between the inner and outer mount plates, with at least one of the inner and outer mount plates being movable relative to the other of the mount plates, to, in turn, alter the shape of the clamshell cavity.

7. The indexing assembly of claim 6 wherein the rack is slidably mounted to the first inner mount plate, and the second rack is slidably mounted to the outer mount plate.

8. The indexing assembly of claim 7 wherein at least one of the pinion gears meshing with the rack rotates in a first direction and at least one of the pinion gears meshing with the rack rotates in a second direction, and, wherein at least one of the pinion gears meshing with the second rack rotates in a first direction and at least one of the pinion gears meshing with the second rack rotates in a second direction.

9. The indexing assembly of claim 7 wherein the rack comprises an L-shaped portion with a first rack gear portion and a second rack gear portion, the first and second rack portions being spaced apart from each other.

10. The indexing assembly of claim 9 wherein the second rack comprises an L-shaped portion with a first rack gear portion and a second rack gear portion, the first and second rack portions being spaced apart from each other.

11. A container denester apparatus for sequentially supplying nested containers, the apparatus comprising:
   an indexer chassis attachable to an outside piece of equipment, the indexer chassis defining a clamshell cavity configured for the passage of a container therethrough;
   an indexing assembly coupled to the indexer chassis, the indexing assembly including a rack that is slidably movable relative to the indexer chassis, and positioned proximate the clamshell cavity, the rack having a rack gear defined on an edge thereof, and the rack configured to slidably move between a starting position and a dispensed position, and, at least one pinion gear rotatably positioned upon a pivot axis coupled to the indexer chassis, the at least one pinion gear meshing with the rack gear of the rack;

a rotating indexing arm rotationally coupled to at least one of the at least one rack gear, the rotating indexing arm having a lower cam profile and an upper cam profile, with the cam profiles selectively extending into the clamshell cavity upon rotation of the at least one pinion gear to which the rotating indexing arm is coupled;

wherein in the starting position, a clamshell container is precluded from passage through the clamshell cavity, and, a portion of an underside surface rests upon the upper cam profile, and whereupon slidable movement of the rack directs the rotation of the rotating indexing arm to release the clamshell container and to urge a downward movement of the clamshell container to facilitate passage through the clamshell cavity, as well as to facilitate separation from an adjacent clamshell container that is nestedly coupled thereto, and further having a guide assembly comprising an inner central guide and an outer central guide, each of the inner and outer central guides being positionable on opposing sides of the clamshell cavity, and spaced apart from either end thereof, each of the central guides being movable both toward and away from the clamshell cavity to provide a width adjustment to accommodate differently sized clamshell containers, wherein each of the inner and outer central guides each comprise a base bar fixedly coupled to the indexing frame, a width adjustment bar extending substantially perpendicular thereto, and an ending bar substantially perpendicular to each of the base bar and the width adjustment bar, and, a clamp member coupling the base bar to the width adjustment bar allowing the width adjustment bar to slidably be positionable along the base bar, and also being slidably movable in a direction substantially perpendicular to the base bar.

12. The indexing assembly of claim 11 wherein the guide assembly further comprises at least one auxiliary guide coupled to the indexing frame having a clamp and a movable bar that selectively extends inwardly and outwardly into the clamshell cavity to a predetermined extent, whereupon positioning, the clamp retains the movable bar in a desired orientation.

13. The indexing assembly of claim 12 wherein a plurality of auxiliary guides are spaced apart about a perimeter of the clamshell cavity.

14. A container denester apparatus for sequentially supplying nested containers, the apparatus comprising:

an indexer chassis attachable to an outside piece of equipment, the indexer chassis defining a clamshell cavity configured for the passage of a container therethrough;

an indexing assembly coupled to the indexer chassis, the indexing assembly including a rack that is slidably movable relative to the indexer chassis, and positioned proximate the clamshell cavity, the rack having a rack gear defined on an edge thereof, and the rack configured to slidably move between a starting position and a dispensed position, and, at least one pinion gear rotatably positioned upon a pivot axis coupled to the indexer chassis, the at least one pinion gear meshing with the rack gear of the rack; and a rotating indexing arm rotationally coupled to at least one of the at least one rack gear, the rotating indexing arm having a lower cam profile and an upper cam profile, with the cam profiles selectively extending into the clamshell cavity upon rotation of the at least one pinion gear to which the rotating indexing arm is coupled;

wherein in the starting position, a clamshell container is precluded from passage through the clamshell cavity, and, a portion of an underside surface rests upon the upper cam profile, and whereupon slidable movement of the rack directs the rotation of the rotating indexing arm to release the clamshell container and to urge a downward movement of the clamshell container to facilitate passage through the clamshell cavity, as well as to facilitate separation from an adjacent clamshell container that is nestedly coupled thereto;

wherein the indexer chassis is coupled to a frame, the frame facilitating arcuate adjustment of the indexer chassis relative to outside equipment to which the frame is coupled.

wherein the frame comprises a pair of opposing bracket assemblies attachable to outside equipment, and a positioning bar to which the indexing frame is coupled, the positioning bar being arcuately adjustable relative to the opposing bracket assemblies.

* * * * *